United States Patent
Tarnavskii

(10) Patent No.: US 8,121,449 B2
(45) Date of Patent: Feb. 21, 2012

(54) PLANAR BRAGG GRATING WITH MODIFIED REFLECTANCE SPECTRUM

(75) Inventor: Stanislav Petrovich Tarnavskii, Sydney (AU)

(73) Assignee: Redfern Integrated Optics, Inc., Santa Clara, CA (US)

( * ) Notice: Subject to any disclaimer, the term of this patent is extended or adjusted under 35 U.S.C. 154(b) by 0 days.

(21) Appl. No.: 11/659,355

(22) PCT Filed: Aug. 25, 2004

(86) PCT No.: PCT/AU2004/001131
§ 371 (c)(1),
(2), (4) Date: Feb. 5, 2007

(87) PCT Pub. No.: WO2006/021019
PCT Pub. Date: Mar. 2, 2006

(65) Prior Publication Data
US 2008/0080813 A1    Apr. 3, 2008

(51) Int. Cl.
*G02B 6/34* (2006.01)
(52) U.S. Cl. .......................................................... 385/37
(58) Field of Classification Search .................. None
See application file for complete search history.

(56) References Cited

U.S. PATENT DOCUMENTS

| | | | |
|---|---|---|---|
| 5,668,900 A | 9/1997 | Little et al. | |
| 5,764,829 A * | 6/1998 | Judkins et al. | 385/37 |
| 5,832,154 A * | 11/1998 | Uetsuka et al. | 385/37 |
| 5,848,207 A | 12/1998 | Uetsuka et al. | |
| 6,463,194 B1 * | 10/2002 | Canning et al. | 385/37 |
| 6,823,111 B2 * | 11/2004 | Jette et al. | 385/37 |
| 2004/0131102 A1 * | 7/2004 | Jette et al. | 372/97 |
| 2007/0237457 A1 * | 10/2007 | Davis et al. | 385/37 |

FOREIGN PATENT DOCUMENTS

| | | |
|---|---|---|
| EP | 0 793 123 A1 | 9/1997 |
| WO | WO03/034112 A1 | 4/2003 |
| WO | WO03/102646 A2 | 12/2003 |

OTHER PUBLICATIONS

M. Berendt et al. UV written Bragg gratings in tapered waveguides, a response shaping approach. LEOS '97 Conference Proceedings, 2:359-360, Nov. 1997.*
M. Kim et al. Tailoring chirp characteristics of waveguide Bragg gratings using tapered core profiles. IEEE Photonics Technology Letters, 18:22:2413-2415, Nov. 2006.*
International Search Report and Written Opinion issued for PCT/AU2004/001131 on Dec. 3, 2004.

* cited by examiner

*Primary Examiner* — Mike Stahl
(74) *Attorney, Agent, or Firm* — David H. Jaffer; Pillsbury Winthrop Shaw Pittman LLP

(57) ABSTRACT

A planar photonic waveguide incorporating a Bragg grating having an asymmetric reflectance spectrum (200). In one embodiment, "red" side lobes (210) are suppressed relative to "blue" side lobes (220). In another embodiment, blue side lobes are suppressed relative to red side lobes. The waveguide has a core with dimensions which vary along the length of the grating so as to produce the asymmetric reflectance spectrum. Where red side lobes are suppressed, the width of the core is greatest in the middle of the grating and decreases symmetrically towards each end.

11 Claims, 5 Drawing Sheets

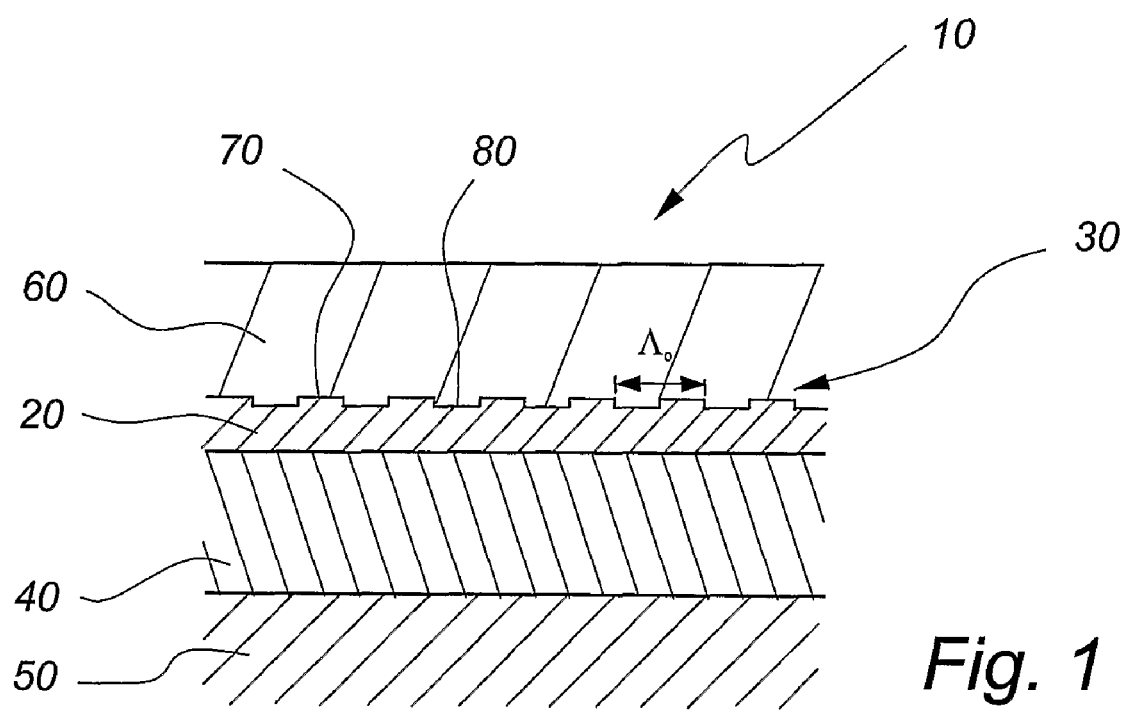

PLANAR BRAGG GRATING WITH MODIFIED REFLECTANCE SPECTRUM

TECHNICAL FIELD

The present invention relates to planar waveguide Bragg gratings for photonic applications.

BACKGROUND OF THE INVENTION

Bragg gratings have a number of important applications in optical components, such as lasers, sensors and dispersion-compensation devices. A Bragg grating formed in a photonic waveguide reflects a characteristic wavelength or range of wavelengths centred at a characteristic wavelength, referred to as the Bragg wavelength $\lambda_B$. The Bragg wavelength depends on an effective refractive index of the waveguide $n_{eff}$ and a period $\Lambda$ of refractive index variations in the grating, according to the equation:

$$\lambda_B = 2n_{eff}\Lambda \qquad (1)$$

The period of the grating $\Lambda$ may be constant, in which case a narrow range of wavelengths are reflected, or the period may intentionally change throughout the grating and cause reflections over a range of wavelengths. Bragg gratings can been formed in optical fibers and planar waveguides. A planar waveguide, also referred to as a planar lightwave circuit (PLC), is an optical waveguide formed by one or more thin transparent films on a generally-planar substrate. Planar waveguides confine optical power within a region referred to herein as the core. The core has a higher refractive index than surrounding material and is generally configured as either a channel waveguide, or rib waveguide.

The reflectance spectrum of a Bragg grating typically comprises a central reflectance peak located at the Bragg wavelength $\lambda_B$ and multiple side lobes which have lower reflectances than the central peak and are located at wavelengths either side of the central peak. The ratio of the magnitude of the largest side lobe to the magnitude of the central peak is referred to as the side-lobe suppression ratio (SLSR), usually expressed in dB. Most, if not all, applications of Bragg gratings require the SLSR to be as low as possible. However, a tailored SLSR can be difficult to achieve, particularly for planar gratings. For some applications, such as external-cavity lasers, it is much more critical to suppress the side lobes located at wavelengths greater than $\lambda_B$ (referred to as the "red" side of the central peak) than the side lobes located at wavelengths lower than $\lambda_B$ (referred to as the "blue" side of the central peak). This is because the phase conditions for lasing on the blue side tend to be spaced further from the central peak where than on the red side (the magnitudes of side lobes tend to reduce with increased spectral distance from the central peak). The prior art does not disclose a technique for increasing the suppression of side lobes on the red side of the central peak relative to side lobes on the blue side, or vice versa.

SUMMARY OF THE INVENTION

In accordance with a first aspect of the invention there is provided a planar photonic waveguide incorporating a grating region in which a Bragg grating is formed, the grating having a reflectance spectrum comprising a central peak located at a central wavelength $\lambda_B$ and side lobes located at wavelengths either side of the central peak, wherein the waveguide has dimensions which vary along the length of the grating region in a manner which contributes to the magnitudes of side lobes at wavelengths greater than $\lambda_B$ to being suppressed relative to side lobes at wavelengths less than $\lambda_B$.

The variation in waveguide dimensions may comprise a variation in a width of a core of the waveguide in the grating region. The core width may be greatest in a central section of the grating region and gradually taper to a narrower width at each end of the grating. The taper may be an exponential taper.

In accordance with a second aspect of the invention there is provided an external-cavity laser incorporating a planar photonic waveguide in accordance with the first aspect.

In accordance with a third aspect of the invention there is provided a method of creating a planar photonic waveguide incorporating a Bragg grating having a corresponding reflectance spectrum comprising a central peak located at a central wavelength $\lambda_B$ and side lobes located at wavelengths either side of the central peak, the magnitudes of side lobes at wavelengths greater than $\lambda_B$ being suppressed relative to side lobes at wavelengths less than $\lambda_B$, the method comprising: forming a waveguide core containing a grating region in which the Bragg grating is formed, the grating region having dimensions which vary along the length of the grating region in a manner which causes the side lobes at wavelengths greater than $\lambda_B$ to be suppressed relative to side lobes at wavelengths less than $\lambda_B$.

It is to be understood that, if any prior art publication is referred to herein, such reference does not constitute an admission that the publication forms a part of the common general knowledge in the art in any country.

For the purposes of this specification it is to be clearly understood that the word "comprising" means "including but not limited to", and that the word "comprises" has a corresponding meaning.

Embodiments of invention will now be described, by way of example only, with reference to accompanying drawings.

BRIEF DESCRIPTION OF THE DRAWINGS

FIG. 1 is a cross-sectional view through a wafer on which a planar photonic waveguide is formed with a surface corrugation Bragg grating.

DETAILED DESCRIPTION OF THE DRAWINGS

Figure 2A:
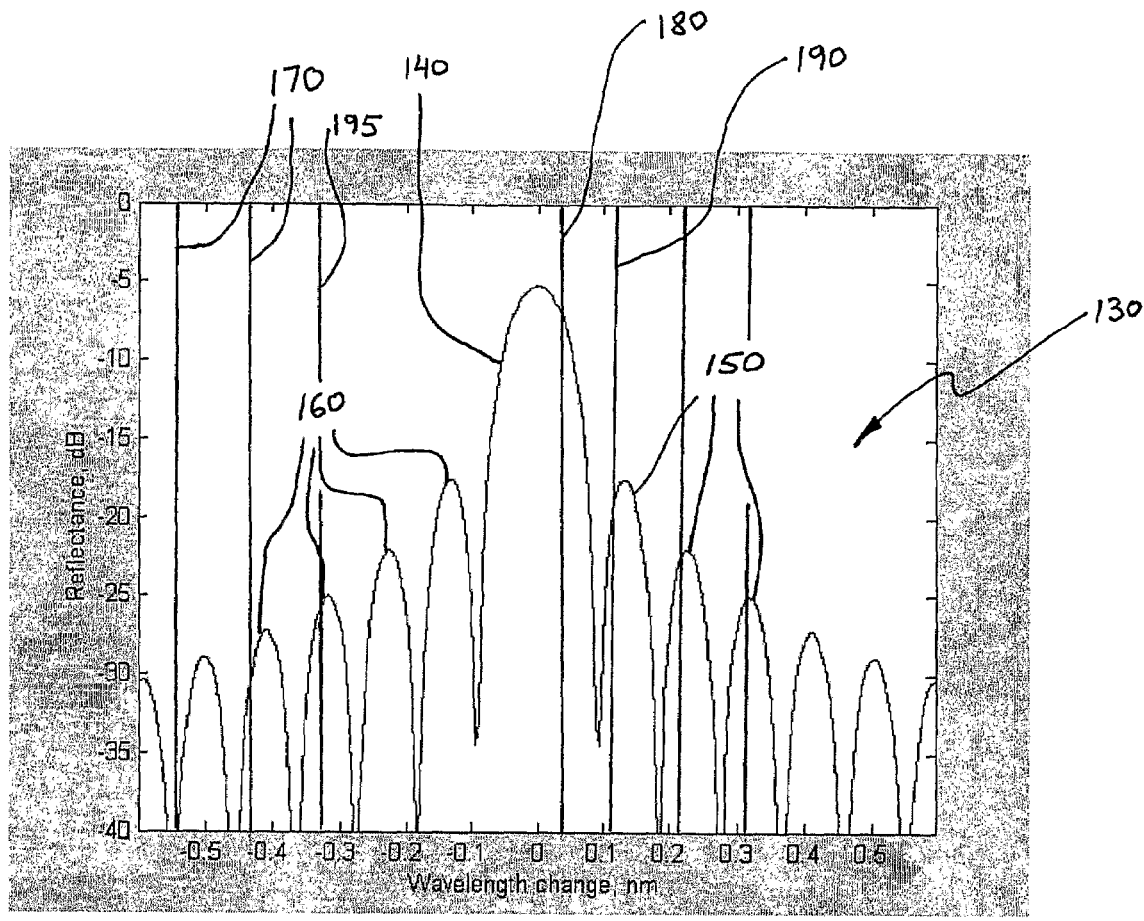
FIG. 2 shows (A) a symmetric grating reflectance spectrum produced by a prior art waveguide and (B) a plan view of the grating region of the prior art waveguide corresponding to the spectrum in (A).

Referring to FIG. 1, there is shown a planar photonic waveguide 10 having a core 20 in which a Bragg grating 30 is formed. The core 20 is formed on a buffer layer 40 which is in turn formed on a wafer 50 of silicon. The core is covered with a cladding layer 60. The core 20 has a higher refractive index than both the buffer layer 40 and cladding layer 60 in order to guide optical modes along the core. In this case the Bragg grating 30 is in the form of a periodic series of peaks 70 and troughs 80, collectively referred to as a surface corrugation, formed in an upper surface of the core 20. The surface corrugation has a nominal period $\Lambda_o$.

Figure 2B:
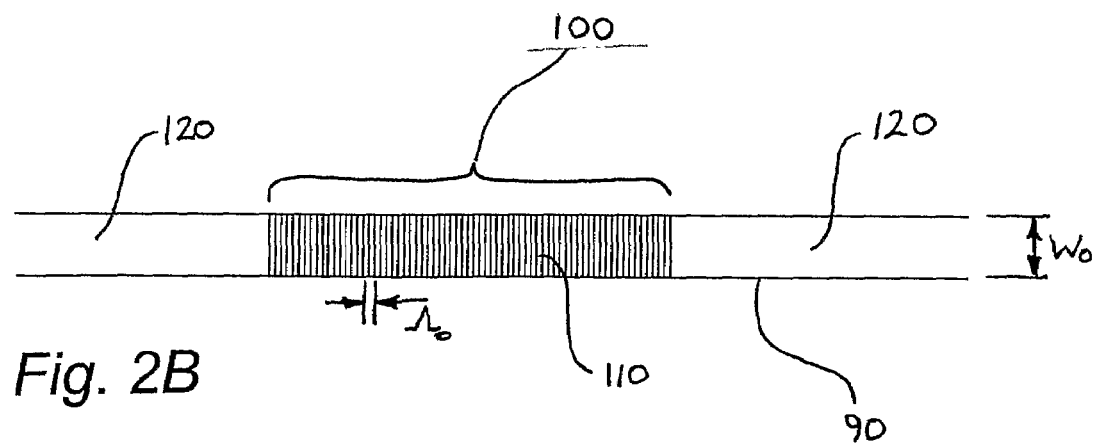

FIG. 2B shows a plan view of a prior art planar waveguide core 90 containing a region 100 in which a grating structure 110 of the type shown in FIG. 1 is defined. In regions 120 beyond the grating region 100 the core has no surface corrugation structure. In this embodiment, the grating region 100 has a constant width $W_o$ which matches the width of the core in the regions 120 extending beyond the grating region. FIG. 2A shows a typical reflectance spectrum 130 for this waveguide. The spectrum comprises a central peak 140, multiple side lobes 150 on the red side of the central peak 140, and multiple side lobes 160 on the blue side of the central peak. The spectrum is symmetric about the central peak 140. For external-cavity laser applications of the grating, lasing can only occur at particular wavelengths which meet the phase condition for lasing. The lasing phase conditions for this waveguide in a particular external cavity laser configuration are indicated in FIG. 2A by vertical lines 170. Ideally, lasing should only take place at the first phase condition 180 on the red side of the central peak, where the lasing stability is good. Close to the first phase condition 180 there is a second phase condition 190 on the second side lobe on the red side. The second side lobe on the red side of the central peak has a reflectance greater than −20 dB, which is too high for many external-cavity laser applications due to the likelihood of parasitic lasing taking place. It can be seen that the second phase condition 195 on the blue side is much further from the central peak 140 than the first phase condition 190. This is typical for external cavity lasers. Since the magnitudes of side lobes tend to reduce with spectral separation from the central peak, it follows that phase conditions on the blue side are less likely to give rise to parasitic lasing than phase conditions on the red side. Consequently, it is desirable for side lobes 150 on the red side to be as low as possible.

Figure 3A:
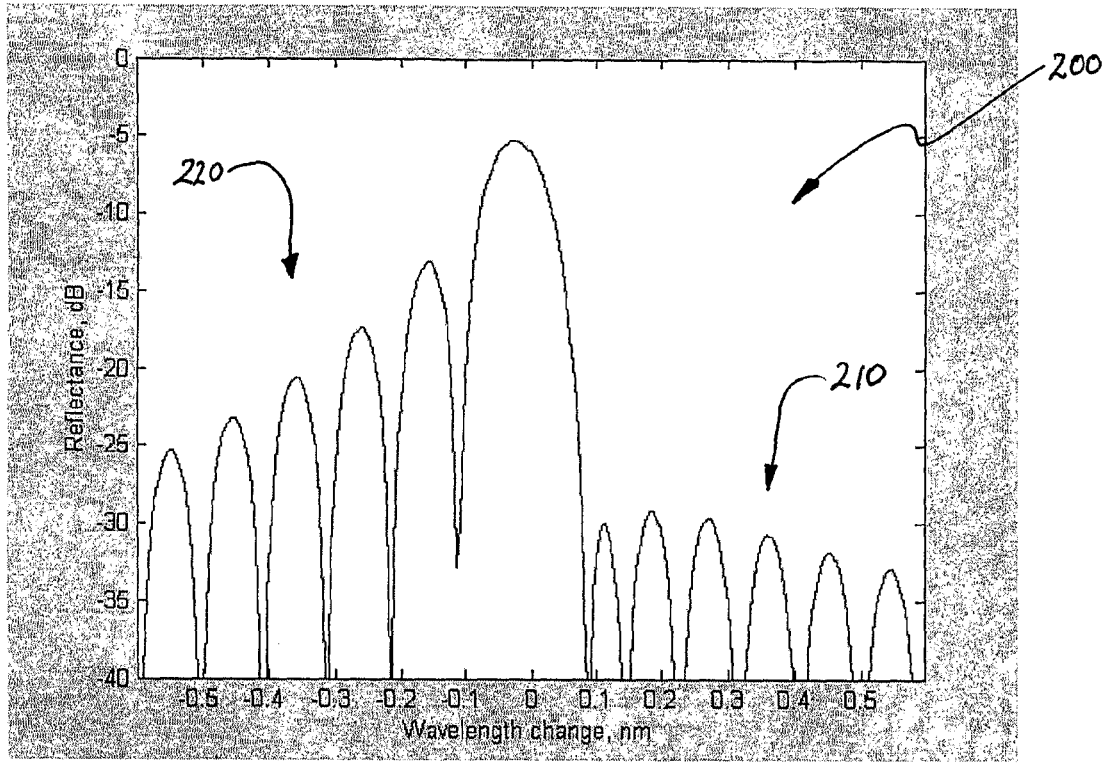
FIG. 3 shows (A) an asymmetric grating reflectance spectrum in which side lobes on the red side of the central peak are suppressed relative to side lobes on the blue side, and (B) a plan view of an embodiment of a grating region in accordance with the invention corresponding to the spectrum in (A).

The inventor has recognised that the reflectance spectrum can be deliberately made asymmetric and that this can be used to suppress reflectances of side lobes on the red side relative to side lobes on the blue side (or vice versa if required). Referring to FIG. 3A, an example of an asymmetric spectrum 200 in which the red side lobes 210 are suppressed relative to the blue side lobes 220, is shown. The greatest reflectance of side lobes 210 on the red side is around −29 dB while the greatest reflectance of side lobes 220 on the blue side is much higher at around −13 dB. Thus all the wavelengths that meet the phase condition for lasing on the red side (other than the phase condition on the central peak) correspond to grating reflectances of lower than −20 dB. This suppression tends to be sufficient to prevent the side modes from lasing. The way in which an asymmetric reflectance spectrum is produced will now be described.

Figure 3B:
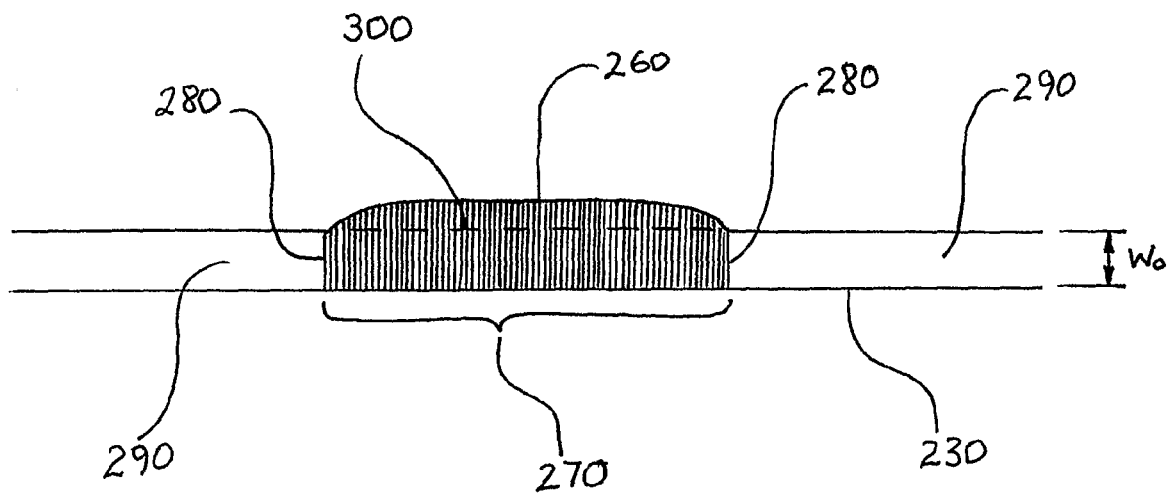
Figure 4A:
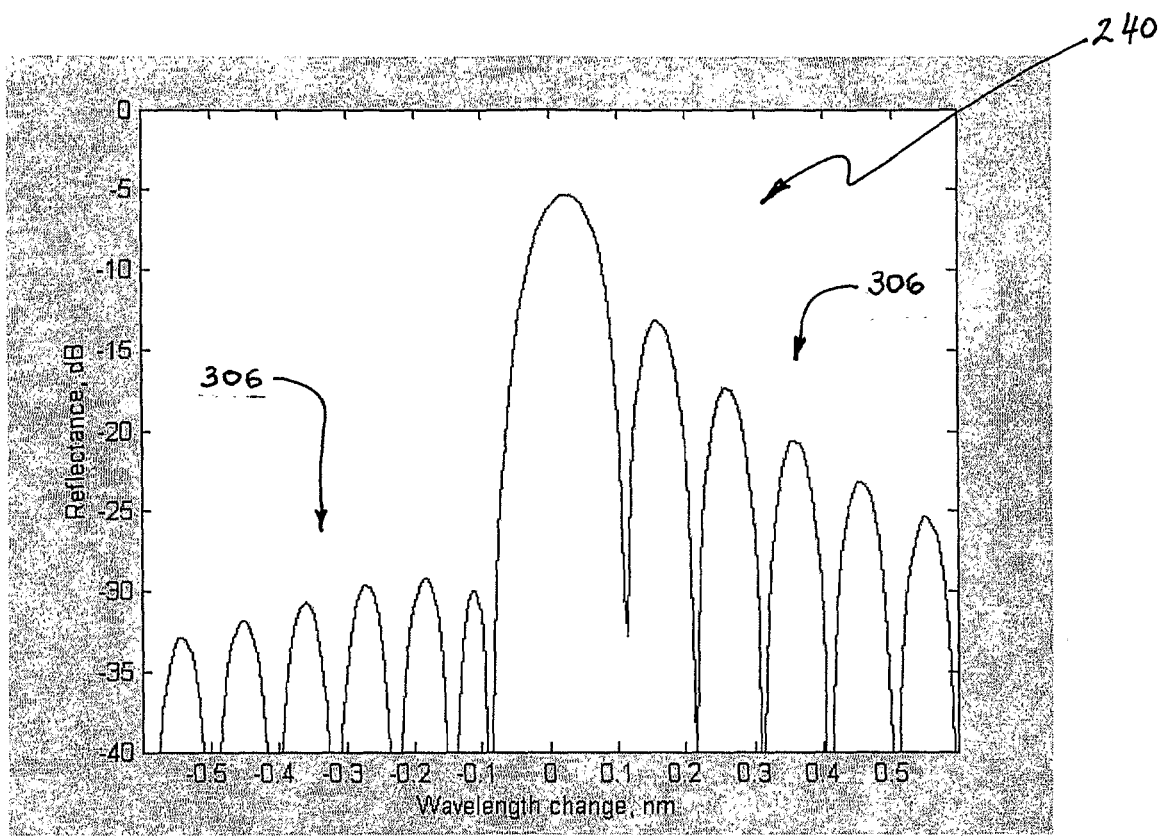
FIG. 4 shows (A) an asymmetric grating reflectance spectrum in which side lobes on the blue side of the central peak are suppressed relative to side lobes on the red side, and (B) a plan view of an embodiment of a grating region in accordance with the invention corresponding to the spectrum in (A).
Figure 4B:
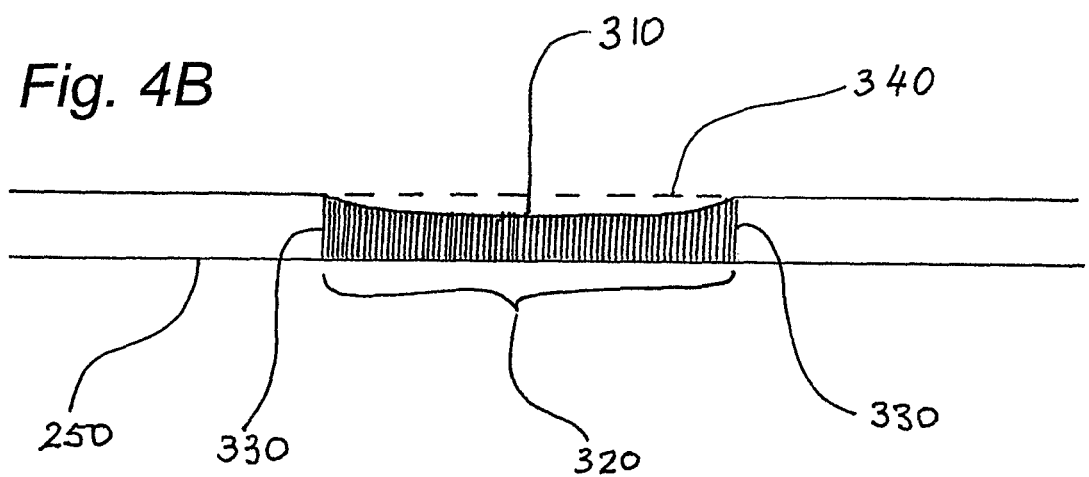

The inventor has recognised that the symmetry of a grating reflectance spectrum is influenced by variations in effective refractive index $n_{eff}$ along the length of the grating. The grating spectrum can be made asymmetric by introducing a controlled variation in $n_{eff}$ along the length of the grating. For a given wavelength, $n_{eff}$ is a function of the waveguide core dimensions and refractive index. Thus, $n_{eff}$ can be altered by controlling the thickness, width or refractive index of the waveguide core. In practice, it is usually difficult to create controlled variations in thickness or refractive index of a planar waveguide core over its length but relatively easy to control the width. Using photolithographically-defined etching, the waveguide width can be defined with an appropriate mask. The waveguide core width W(z) can be described in terms of a variation of width from a fixed value $W_o$:

$$W(z) = W_o + \Delta W(z) \qquad (2)$$

where z is the position along the length of the grating (z=0 at the centre of the grating), and $\Delta W(z)$ is the width variation of the core from $W_o$. The grating spectrum will be asymmetric if the width variation $\Delta W(z)$ is an even function of position z along the length of the grating. An "even" function is understood herein to mean that $\Delta W(z) = \Delta W(-z)$. The inventor has recognised that the grating spectrum will have side lobes on the red side on the central peak which are suppressed relative to side lobes on the blue side of the central peak if $\Delta W(z)$ is an even function and $\Delta W(z) \geq 0$ for all z. An example of such a spectrum 200 and corresponding waveguide 230 (width variation exaggerated) are shown in FIGS. 3A and 3B, respectively. Conversely, the grating spectrum will have side lobes on the blue side on the central peak which are suppressed relative to side lobes on the red side of the central peak if $\Delta W(z)$ is an even function and $\Delta W(z) \leq 0$ for all z. An example of such a spectrum 240 and corresponding waveguide core 250 (width variation is exaggerated) are shown in FIGS. 4A and 4B, respectively.

The extent to which side lobes on one side of the central reflectance peak are suppressed relative to side lobes on the other side is affected by the shape of the function $\Delta W(z)$. It has been found that an even function for which $\Delta W(z) \geq 0$ and is in the form of exponential taper produces a deep and uniform suppression of side lobes on the red side of grating spectrum. An example of this type of width profile is shown in FIG. 3B. The waveguide core 230 has a width profile W(z) which is widest in a central portion 260 half-way along the length of the grating region 270 and narrows with an exponential taper towards each end 280 of the grating region. The width variation in the grating region is exaggerated in FIG. 3B to illustrate the inventive concept. Regions 290 of the core which are devoid of gratings extend from each end 280 of the grating region with a constant width $W_o$. For comparison, a dashed line 300 within the grating region shows the shape of a prior art waveguide which would tend to produce a symmetric spectrum. The waveguide width W(z) in the grating region varies along the length of the grating region from $z = -L_g/2$ to $z = +L_g/2$, where $L_g$ is the length of the grating region. In this embodiment, the width variation $\Delta W(z)$ of the core along the length of the grating region is described by the following equation:

$$\Delta W(z) = -\Delta W_0 \left[ \exp\left(-\frac{z + L_g/2}{d}\right) + \exp\left(-\frac{L_g/2 - z}{d}\right) \right] \qquad (3)$$

Figure 5:
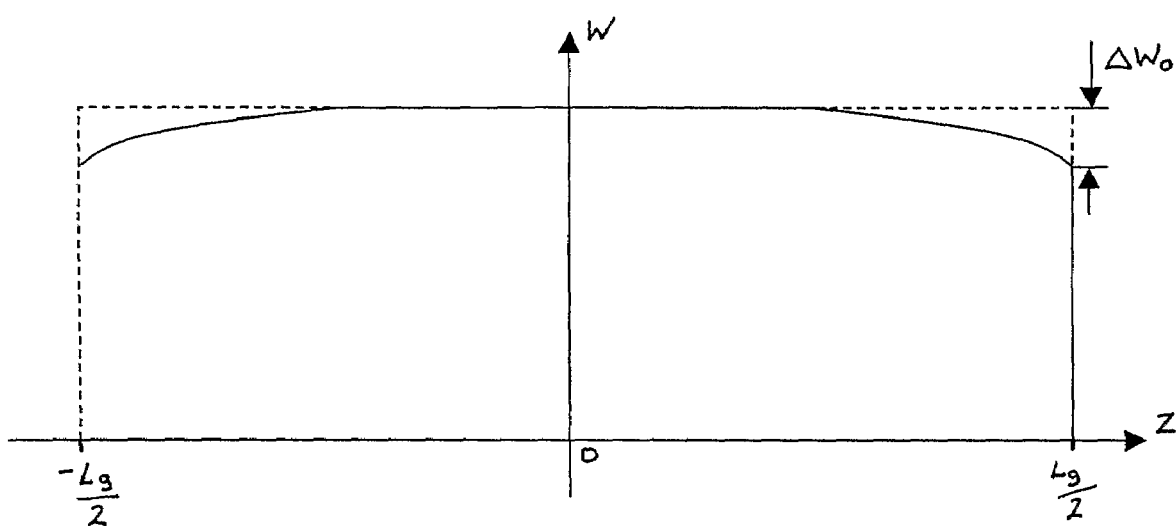
FIG. 5 shows the width profile of the grating region in the waveguide shown in FIG. 3(B).

Here d is an exponential decay length and $\Delta W_0$ is the maximum width variation (see FIG. 5 which shows a plot of W(z)). The value of $\Delta W_0$ is determined by the required change of the effective refractive index $\Delta n_{eff}$. Acceptable values of d and $\Delta n_{eff}$ can be determined by trial and error using grating simulation software to simulate various reflectance spectra until a spectrum is found with appropriate asymmetry.

The spectrum 240 in FIG. 4A where the blue side lobes 306 are suppressed relative to the red side lobes 308 is a result of a grating region which has a width variation $\Delta W(z)$ described by the following equation:

$$\Delta W(z) = \Delta W_0 \left[ \exp\left(-\frac{z + L_g/2}{d}\right) + \exp\left(-\frac{L_g/2 - z}{d}\right) \right] \quad (4)$$

The shape of this width variation, shown in exaggerated form in FIG. 4B, is narrowest in a central portion 310 of the grating region 320 and widens with an exponential taper towards each end 330 of the grating region. A dashed line 340 parallel to the grating region shows the shape of a prior art waveguide which would tend to produce a symmetric spectrum.

Although embodiments of the invention have been described in the context of surface corrugation gratings formed by photolithography, the invention is applicable to planar waveguide gratings formed by any method in which the core width can be controlled, such as electron-beam lithography and UV-exposure (if the core is composed of a UV-sensitive material).

The invention is not limited to any particular waveguide materials. Examples of waveguide core materials include, but are not limited to, silicon dioxide, germanium-doped silicon dioxide, and silicon oxynitride ($SiO_x$).

It will be appreciated by a person skilled in the art that numerous variations and/or modifications may be made to the present invention as shown in the specific embodiment without departing from the spirit or scope of the invention as broadly described. The present embodiments are therefore to be considered in all respects illustrative and not restrictive.

The invention claimed is:

1. A planar photonic waveguide incorporating a grating region in which a Bragg grating is formed, the grating having a reflectance spectrum comprising a central peak located at a central wavelength $\lambda_B$ and side lobes located at wavelengths either side of the central peak, wherein in the grating region, the waveguide has dimensions which vary symmetrically along the length on both sides of a center point of the grating region in a manner which contributes to the magnitudes of side lobes at wavelengths greater than $\lambda_B$ being suppressed relative to side lobes at wavelengths less than $\lambda_B$.

2. A planar photonic waveguide in accordance with claim 1, wherein the variation in waveguide dimensions comprises a variation in a width of a core of the waveguide in the grating region.

3. A planar photonic waveguide in accordance with claim 2, wherein the width of the core is greatest in a central section of the grating region and gradually tapers to a narrower width at each end of the grating.

4. A planar photonic waveguide in accordance with claim 2, wherein the width of the core is greatest in a central section of the grating region and tapers exponentially to a narrower width at each end of the grating.

5. An external-cavity laser incorporating a planar photonic waveguide in accordance with claim 1.

6. A method of creating a planar photonic waveguide incorporating a Bragg grating with a corresponding reflectance spectrum comprising a central peak located at a central wavelength $\lambda_B$ and side lobes located at wavelengths either side of the central peak, the magnitudes of side lobes at wavelengths greater than $\lambda_B$ being suppressed relative to side lobes at wavelengths less than $\lambda_B$, the method comprising:
forming a waveguide core containing a grating region in which the Bragg grating is formed, the grating region having dimensions which vary symmetrically along the length on both sides of a center point of the grating region in a manner which causes the side lobes at wavelengths greater than $\lambda_B$ to be suppressed relative to side lobes at wavelengths less than $\lambda_B$.

7. A method of creating a planar photonic waveguide in accordance with claim 6, wherein the variation in waveguide dimensions comprises a variation in width of the waveguide in the grating region.

8. A method of creating a planar photonic waveguide in accordance with claim 7, wherein the width of the core is greatest in a central section of the grating region and gradually tapers to a narrower width at each end of the grating.

9. A method of creating a planar photonic waveguide in accordance with claim 7, wherein the width of the core is greatest in a central section of the grating region and tapers exponentially to a narrower width at each end of the grating.

10. A method of creating a planar photonic waveguide in accordance with claim 6, wherein the variation in waveguide dimensions comprises a variation in a width of a core of the waveguide in the grating region, the width variation being in the form of an even function of position z along the length of the grating region, with z=0 being half-way along the length of the grating region.

11. A method of creating an external-cavity laser incorporating a planar photonic waveguide formed in accordance with the method of claim 6.

* * * * *